United States Patent Office 3,679,362
Patented July 25, 1972

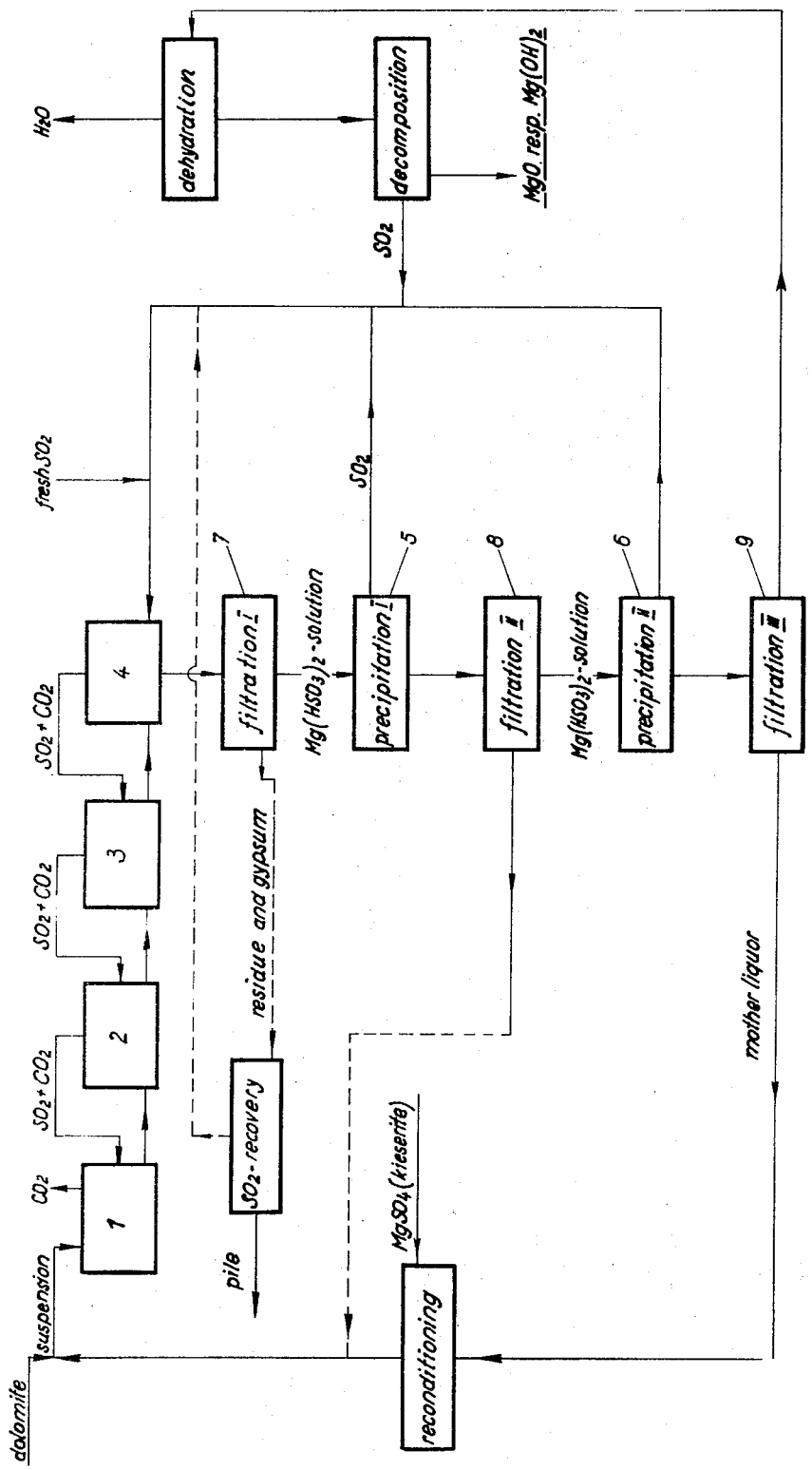

3,679,362
PROCESS FOR MAKING MAGNESIUM OXIDE OR HYDROXIDE FROM MAGNESIUM CONTAINING RAW MATERIALS
Hellmut Hartmann, Braunschweig, and Gerhard Budan, Wathlingen, Celle, Germany; said Budan assignor to Hellmut Hartmann, Braunschweig, and Wintershall Aktiengesellschaft, Kassel, Germany
Filed Feb. 19, 1969, Ser. No. 800,592
Int. Cl. C01f 5/14, 5/16; C01b 17/48
U.S. Cl. 23—201
28 Claims

ABSTRACT OF THE DISCLOSURE

A substantially pure magnesia or magnesium hydroxide is obtained by proceeding in succession as follows:
(a) treating a magnesium sulfate suspension of a magnesium containing raw material with sulfur dioxide to form a solution of magnesium bisulfite upon release of $CO_2$;
(b) separating the formed gypsum and insoluble residue from the said solution;
(c) converting the dissolved magnesium bisulfite to an insoluble neutral hydrate of magnesium sulfite that is substantially free of calcium;
(d) separating the hydrate from the mother liquor;
(e) dehydrating the said magnesium sulfite hydrate; and
(f) decomposing the sulfite to magnesium oxide or magnesium hydroxide while drawing off the sulfur dioxide.

BACKGROUND OF THE INVENTION

There is a substantial demand in industry for magnesia and magnesium hydroxide, particularly for making of sintered magnesia and other fireproof products. Processes have therefore been known for decades to make these materials from magnesium-containing minerals or salts. These processes for making synthetic magnesia or brucite have, however, obtained impotrance only where it was possible to recover a more or less pure magnesia. This is not readily the case when proceeding from magnesite or dolomite, from salt water or from magnesium salts.

For the processing of calcined dolomite, it has been proposed to react the material with a magnesium chloride solution so as to form magnesia and a calcium chloride liquor. However, with this type of reaction no pure magnesia is obtained, and besides, an undesirable waste liquid of calcium chloride is formed.

Other proposals have been to react calcined dolomite with $NH_4$ salt solutions in which case, likewise, $CaCl_2$ or $CaSO_4$ are formed as well as a magnesium chloride solution from which magnesium hydroxide can be precipitated with ammonia.

French Pat. 908,072 concerns a process for the partial decomposition of dolomite to $CaCO_3 \cdot MgO$ and the reaction with an $(NH_4)_2SO_4$ solution whereby an $MgSO_4$ solution and $NH_3$ is formed along with $CaCO_3$. By introducing further $NH_3$ amounts it is possible to precipitate $Mg(OH)_2$ and again to obtain a solution of $(NH_4)_2SO_4$.

There are processes also known by which an $MgSO_4$ solution is directly converted to $Mg(OH)_2$ from kieserite by means of excess ammonia and application of heat. These processes permit obtaining of a pure magnesia but they require a substantial industrial equipment in order to avoid N-losses. Besides, in the equilibration reaction of the $NH_3$ precipitate ammonia schoenite is formed along $(NH_4)_2SO_4$ which must be further treated and reacted. It is difficult to recirculate this product of the reaction, which interferes with the operation, into the circulation, and also in using it as fertilizer.

Processes have also become known to dissolve calcined dolomite in a mineral acid and to precipitate $Mg(OH)_2$ from the solution after separation of the matrix by means of lime. These methods, however, have not gained industrial acceptance since they only lead to a CaO- or $SiO_2$-containing magnesia. Processes which relate to the calcination of magnesium chloride or magnesium sulfate or of the hydrates of these substances at high temperatures and conversion to magnesia likewise result only in impure calcined products containing salts, particularly oxychlorides, which for this reason are not useful in the manufacture of high grade sintered magnesia.

U.S. Pat. No. 2,118,353 and 2,643,181 propose first to carry out a partial decomposition of the dolomite and thereafter to react the product of $CaCO_3 \cdot MgO$ in solution with hydrogen sulfide. This composition does not result in a Ca-free starting product and it is therefore necessary to react the CaO with magnesium sulfide to form anhydrite. Even though the purity of the magnesia obtained may be 99.5% the necessity of the thermal decomposition of the dolomite involves technical and economic drawbacks. The handling of $H_2S$ also is quite disadvantageous in view of its substantial toxic action as compared with the use of $SO_2$. These processes have therefore not found acceptance by industrial practice.

The invention therefore has the object to provide an economical process for making a fine grained, pure and highly reactive magnesia in the form of MgO or $Mg(OH)_2$ from magnesium-containing raw materials. It is another object of the invention to make magnesia that is more or less free of calcium oxide. It is a further object of the invention to permit obtaining magnesia from such diverse materials as dolomite, magnesite, limestone and marble.

SUMMARY OF THE INVENTION

These objectives are accomplished by a process comprising, in succession, the steps of
(a) treating a magnesium sulfate suspension of the magnesium-containing raw material with sulfur dioxide so as to form a solution of magnesium bisulfite upon release of carbon dioxide;
(b) separating the formed gypsum and other insoluble residue from the said solution;
(c) converting the dissolved magnesium bisulfite to an insoluble neutral hydrate of magnesium sulfite, that is substantially free of calcium;
(d) separating the hydrate from the mother liquor;
(e) dehydrating the said magnesium sulfite hydrate; and
(f) decomposing the sulfite to magnesium oxide or magnesium hydroxide while driving off the sulfur dioxide.

A particular feature of the invention is the recovery of the sulfur dioxide driven off in various stages of the process and recirculation into the first stage for reaction with the magnesium sulfate suspension.

Another feature of the invention is the reconditioning of the mother liquor resulting from the conversion of the magnesium bisulfite with magnesium sulfate and recirculating of the liquor into the first stage of the process.

BRIEF DESCRIPTION OF THE DRAWING

The drawing is a flow sheet illustrating an embodiment of the invention wherein MgO and $Mg(OH)_2$ are obtained from dolomite.

DESCRIPTION OF THE PREFERRED EMBODIMENTS

The process of the invention avoids the drawbacks of the thermal decomposition of dolomite and still permits obtaining of a finely-distributed, pure and highly reactive magnesia in the form of MgO or Mg(OH)$_2$ from the magnesium-containing raw materials. A preferred raw material is dolomite which, for instance, may have the following composition: MgCO$_3$ 42.6%; CaCO$_3$ 56.6%; Fe$_2$O$_3$ 0.3%; SiO$_2$ 0.4%; Al$_2$O$_3$ 0.1%.

The reaction of SO$_2$ with the suspension of the magnesium-containing raw material in sulfuric acid requires a suspension wherein the contents of SO$_4$-ions is equimolar to the Ca-ions originating from the suspended raw material such as dolomite. It is preferred to apply the treatment with sulfur dioxide to suspended dolomite in a solution containing MgSO$_4$ wherein the contents of SO$_4$-ions and Ca-ions of the suspended dolomite is more than equimolar.

When proceeding from finely-ground limestone, it has been found that a magnesia with only minor CaO contents and practically no SiO$_2$ can be obtained if a molar ratio of CaO:MgSO$_4$ is employed from 1 or 1.2:2.0, and in particular in the range from 1:1.6 to 1:1.8.

If the molar ratio of CaO:SO$_2$ is below the indicated ratio and is, for instance, 1:1, a magnesia is obtained during the calcination of the Mg-sulfide-trihydrate produced in the course of the process of the invention which would have the following composition: MgO 86.77%; CaO 5.45%; SO$_3$ 7.78%. The CaO fraction in that case is about 18 times larger than it would be in the process of the invention. A mole ratio of CaO:SO$_2$ above 1:2, on the other hand, does not involve any particular advantage for the purity of the magnesia.

It is also possible to recondition the mother liquor regarding its SO$_4$ contents with kieserite obtained from the flotation residue or with calcined kieserite. This can be done by passing the mother liquor through the kieserite, preferably at a temperature between 40 and 70° C., and particularly at a temperature of about 65° C.

The mother liquor preferably is reconditioned to a concentration where there are present about 300 to 400 g./l., in particular 350 g. of MgSO$_4$ per liter of liquid.

It is also possible to use finely-ground marble instead of limestone as CaCO$_3$ source.

The reaction of the suspension of finely-ground raw materials such as dolomite or crude magnesite with sulfur dioxide is preferably carried out in countercurrent. The suspension, accordingly, should be passed through a series of reaction vessels while the sulfur dioxide is introduced in finely-distributed form into the last vessel first. The sulfur dioxide and the carbon dioxide as the inert gas which is released during the reaction are then passed in countercurrent from the last vessel in series to the first vessel.

According to a special feature of the invention it is possible to effect the precipitation of the neutral hydrate of magnesium sulfite from the solution of magnesium bisulfite by adding magnesium oxide or magnesium hydroxide instead of driving off, by heating or boiling, the dissolved sulfur dioxide. This is in particular possible with precipitation of the trihydrate.

According to a preferred form of the invention the magnesium oxide or magnesium hydroxide may be added dry or as an aqueous suspension to the Mg(HSO$_3$)$_2$ solution which has been separated from the residue in order to form the neutral MgSO$_3$ hydrate. The suspension preferably should contain between 50 and 400 grams of solids per liter of liquid. The addition preferably is made at room temperature and upon continued stirring causing the neutral MgSO$_3$-hydrate, particularly the trihydrate, to precipitate almost completely. The precipitate is then separated from the mother liquor, is washed, dehydrated and thermally decomposed. About half the amount of magnesium oxide thus produced is removed and about the other half is employed for renewed precipitation of MgSO$_3$ hydrate. The sulfur dioxide which is driven off during the thermal decomposition is likewise recirculated for further treatment of the starting product. The mother liquor which results from the MgSO$_3$ hydrate precipitation is then reconditioned by concentration with MgSO$_4$ in an amount which is at least equivalent to the calcium introduced by the dolomite and is thereafter recirculated for further reaction with dolomite.

Another feature of the invention is that the reconditioning or reconcentration of the mother liquor with MgSO$_4$ can be effected by employing dry or wet kieserite, particularly the kieserite obtained as residue from kieserite floatation, or by using an MgSO$_4$ solution of kieserite or epsom salt.

The process of the invention thus has the advantage that the cost of a distillation apparatus is saved, since this can be replaced by a stirring device.

Though it is true that an additional circuit is necessary for the MgO or Mg(OH)$_2$ which is equal to about half the amount of the magnesia obtained, a substantial reduction is nevertheless accomplished in heat consumption for the total process, and the output is substantially increased since, with this type of proceeding, the driving off and the boiling out of the sulfur dioxide can be dispensed with. The substantial time spent in these latter steps is made up by the considerably expedited precipitation of the hydrate of magnesium sulfite.

In case of boiling of the sulfite solution, it is necessary to heat the entire solution of bisulfite to 100° C. and then to maintain it for a substantial period of time in boiling condition. If the boiling is carried out discontinuously, that is by batches, several hours are necessary to remove the last residues of sulfur dioxide. If a continuous boiling operation is carried out with a distillation apparatus, only between 80 and 90% of the sulfur dioxide can be removed. The yield of MgSO$_3$·3H$_2$O is therefore correspondingly quite low. A corresponding cooling of the SO$_2$ which is distilled off is, in any case, necessary, and the reflux of the steam that escapes with it must be arranged. This requires therefore a distillation apparatus with a bottom column. If the water is not stripped off and reintroduced to the distillation vessel, a too-rapid concentration of the solution of bisulfite will result to an extent that MgSO$_4$ hydrate such as hexahydrate along with MgSO$_3$·3H$_2$O separate out. This type of process leads autocatalytically to a rapid clogging up of the apparatus if the distillation is not immediately interrupted. All these drawbacks are obviated by the described feature of the invention.

The precipitation of the neutral Mg(HSO$_3$)$_2$ hydrate with MgO or Mg(OH)$_2$, on the other hand, does not involve any particular difficulties. It takes place at room temperature, resulting in a slight warming up of the reaction mixture. The precipitated product can easily be filtered and contains virtually the entire sulfur dioxide, except for a small portion corresponding to the solubility of the MgSO$_3$·3H$_2$O in water or the MgSO$_4$ solution.

The process of the invention permits obtaining magnesia in a form which consists of crystals recovered from a clear solution, and therefore constituting a pure product. This product can after dehydration be converted to a more or less active, that is, either chemically active or inactive i.e., dead burned product in the form of Mg(OH)$_2$ or MgO. Which type of product is desired will determine which temperatures and which time of decomposition has to be used. The dehydration normally can be effected at rather low temperatures such as 100–120° C.

The following examples are given to illustrate the invention.

Example 1

100 kg. of finely-ground dolomite were suspended in 100 liters water together with 155 kg. of epsom salt. The suspension was then treated with SO$_2$ upon stirring and cooling, thus causing the carbon dioxide to escape. The resulting solution of magnesium bisulfite was separated from a residue amounting to about 80 kg. and containing 24.8% Ca and 1.85% Mg. The solution obtained by filtration was then subjected to precipitation in two stages. In the first stage, the dissolved SO$_2$ was driven off and a precipitate was obtained in the amount of 6 kg., containing 25% Ca and 2.5% Mg. After separation of this residue, the solution was subjected to the second stage precipitation, resulting in 80 kg. of magnesium sulfite hydrate, containing 0.1 to 0.2% Ca and 15.4% Mg. The mother liquor, which was free of calcium, was recycled into the first process stage.

A magnesia in the form of MgO was recovered from the precipitation product of the second precipitation stage after dehydration and by means of a decomposition step, for instance at 100° C. In this step the sulfur dioxide was recovered. The magnesia had a magnesium content of 59.7%. The loss in the roasting step upon decomposition of the sulfite amounted to 74.5%.

The process of this example is illustrated in further detail in the accompanying flow sheet. As appears, the finely-ground dolomite is introduced into a closed reaction vessel 1. It then proceeds to subsequent reaction vessels 2, 3, 4. In vessel 4 there is an outlet at the lower portion of the vessel from which the residue and gypsum is passed out. The suspension of dolomite which passes successively through the various reaction vessels is formed with recycled mother liquor which, in addition, is reconditioned by added water and magnesium sulfate, in particular in the form of kieserite, so as to increase its content of $SO_4$ ions. Sulfur dioxide is passed in countercurrent through the reaction vessels. It preferably enters at the lower portion of the vessel 4 and then flows successively through the preceding vessels 3, 2, 1. The gas mixture containing an increasing amount of $CO_2$ preferably escapes at the upper section of the reaction vessels 4, 3, 2 and is passed by conduits successively into the subsequent vessels at their lower portion.

As appears from the flow sheet, part of the $SO_2$ employed in the treatment of the dolomite suspension is obtained from the precipitation stages I and II where it is formed by boiling or heating in the closed vessels 5 and 6. The process of the invention accordingly involves the feature, on one hand, that sulfur dioxide is employed for the treatment of the magnesium-containing raw material and, on the other hand, that the sulfur dioxide in the course of the operation is recycled by collecting the sulfur dioxide which is dissolved and driven off and which is also obtained by decomposition of the sulfite. It is only necessary to replenish small losses of sulfur dioxide by addition of fresh $SO_2$.

The residue and gypsum are separated out in the filtration stages I and II by means of filtering devices such as rotary filters, centrifuges or similar, indicated at 7 and 8. In the filtration stage III $MgSO_3 \cdot 3H_2O$ is separated by means of the filtering device 9 from the mother liquor, and the mother liquor as indicated is recycled for making the dolomite suspension.

The dehydration of the sulfite and the decomposition of $MgSO_3$ is usually carried out in a rotary furnace but a shaft furnace may also be used to recover the $SO_2$.

The filtration residue of the filter stage II contains, in addition to gypsum, certain amounts of $CaSO_3$, the elimination of which would result in a loss of $SO_2$. In order to avoid this, it is possible to re-use the product of the precipitation stage I together with the freshly introduced dolomite in reaction vessel 1.

The $SO_2$ necessary for the reaction with the dolomite can be obtained, to the extent that losses must be replenished, from precipitated gypsum recovered in the filtration stage I, see the flow sheet. The process can therefore be operated completely independently of addition of elemental sulfur.

The reaction stages occurring in the procedure of this example may be represented by the following equations:

(a)
$CaCO_3 \cdot MgCO_3 + MgSO_4 \cdot 7H_2O + 4SO_2 + H_2O \longrightarrow$
(dolomite)

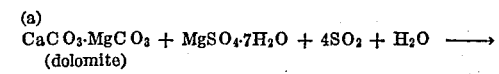
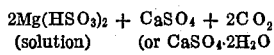

(b) $2Mg(HSO_3)_2 \longrightarrow 2MgSO_3 \cdot 3H_2O$ (crystals) $+ 2SO_2$
(solution)

(c) $2MgSO_3 \cdot 3H_2O \longrightarrow 2MgSO_3 + 6H_2O$ (d) $2MgSO_3 \longrightarrow 2MgO + 2SO_2$ Example 2

This example illustrates the use of a cooled kieserite and limestone.

77.8 kg. of a mother liquor obtained from the magnesium sulfite precipitation of the preceding run and containing 5.75% MgO, 9.80% $SO_3$, 2.56% $SO_2$ and 0.03% CaO were reconditioned by means of a percolation operation with crude kieserite (81.3% $MgSO_4$) at 65–70° C. The amount of crude kieserite employed was 23.6 kg. After dilution with 18.4 kg. wash water, obtained from the preceding run, a solution containing 25.9% $MgSO_4$ corresponding to 335 g. per liter was obtained. 14.8 kg. of finely-ground limestone (98.6% $CaCO_3$) were then added to the solution after it had cooled down to about 35° C. The grain size of the limestone was below 1 mm. The addition was effected by stirring.

20 kg. gaseous $SO_2$ were then introduced into the thus-formed suspension upon stirring and slight cooling to release the heat of reaction. At the end of the reaction the temperature should not be in excess of 30° C.

The gypsum which separated out was removed by filtration and washed with water. The wash water was then used to dilute the recycled mother liquor of the next run.

After separating the gypsum there was left about 125 kg. of a reaction liquor which contained only 0.06% CaO. The product was then subjected to heating and was kept at the boiling point a sufficient time to drive off about half of the originally introduced $SO_2$ in gaseous form. The $SO_2$ was then reintroduced upon cooling into the reaction stage, resulting in the simultaneous separation of water which was distilled off with the $SO_2$. The water should be used preferably as wash water in order to avoid even small $SO_2$ losses.

A neutral magnesium sulfite trihydrate was separated out during the boiling of the reaction liquor in the form of a white, granulous, easily-filtered product. After filtration and washing with water (forming wash water for the final liquor), there were obtained 25 kg. of wet Mg sulfite of the following contents: MgO 24.3%; $SO_2$ 37.1%; CaO 0.08%; $SO_3$ 2.0%; $H_2O$ 36.5%. The total amount of liquor obtained was 77.8 kg. This liquor was recycled into the operation and again reconditioned with $MgSO_4$.

The magnesium sulfite trihydrate which was removed by filtration and subjected to washing was then dried at about 100° C. and thereafter subjected to heating in a rotary furnace at a rapid rate to a temperature of 800° C. The $SO_2$ that separated out was recycled into the operation. Additional carbon dioxide was preferably introduced in the rotary furnace during the decomposition of the sulfite in order to avoid oxidation of the $SO_2$. For this purpose, it is also possible to employ the carbon dioxide that develops during the reaction of the $CaCO_3$.

As the final product, there were obtained 6.5 kg. magnesia having the following composition: MgO 92.12%; CaO 0.30%; $SO_3$ 7.58%. The sulfate fraction of the magnesia can be lowered by reducing agents such as carbon to an amount below 1% during the calcination. The product accordingly contained only a very small proportion of CaO and was more or less free of $SiO_2$.

The mole ratio of CaO:$MgSO_4$ in this example was 1:1.73.

Instead of the limestone employed in this case, finely-ground marble could also have been used as the source of $CaCO_3$.

The following equation represents the reactions carried out in this example:

(a) CaCO₃ + MgSO₄·H₂O + 2SO₂ ⟶
 (limestone) (kieserite)
  Mg(HSO₃)₂ + CaSO₄ (or CaSO₄·2H₂O) + CO₂
  (solution)

(b) corresponds to (c) and (d) in Example 1.

Example 3

This example illustrates the feature that the bisulfite solution is converted to the hydrate by adding MgO or Mg(OH)₂ at room temperature without heating the solution to boiling temperature.

5 metric tons of Mg(HSO₃)₂ solution of the composition MgO 6.94%, SO₂ 12.10%, and SO₃ 6.42% were reacted with 195 kg. MgO suspended in 400 liters of water. The reaction was carried out in an open vessel provided with a stirring device at room temperature.

The hydroxide dissolved rapidly and after about half a minute to two minutes, MgSO₃·3H₂O commenced to crystallize. The separation of this material was complete after continuous stirring for about ½ to 1 hour. The wet product was washed after the first filtration by decanting or by setting up a mash with water. It was then separated and dried at a temperature up to about 80° C. There were obtained 1.9 t. of wet MgSO₃·3H₂O corresponding to 1.46 t. dry product. After drying and decomposition of at least 900° C., there were obtained 0.372 t. MgO and 591 kg. SO₂. Of the thus-obtained amount of MgO, about 195 kg. were recycled into the operation. The amount of MgO obtained as final product was therefore 177 kg. The mother liquor from the precipitation had the composition: MgO 4.60%, SO₂ 0.38%, SO₃ 8.69%.

The wash water was recycled into the operation by employing it for the dilution of the Mg(HSO₃)₂ solution prior to setting up the precipitation magnesia. The SO₂ yield from the precipitation was 97.7%; there were left in the liquor only 2.3% SO₂. This type of a yield cannot be obtained when the solution is heated to boiling temperature.

The following equation represents the reaction carried out in this example:

(a)    Mg(HSO₃)₂ + MgO + 5H₂O ⟶ 2MgSO₃·3H₂O
or
    Mg(HSO₃)₂ + Mg(OH)₂ + 4H₂O ⟶ 2MgSO₃·3H₂O
   (solution)

Example 4

This example illustrates the use of crude magnesite together with kieserite.

230 kg. of finely-ground crude magnesite of the composition 43.5% MgO, 2.6% CaO, 2.3% Fe₂O₃ and Al₂O₃, 49.2% CO₂, and 2.4% SiO₂ were suspended, together with 25 kg. kieserite (80% MgSO₄) and 306 liters of water, in 1.30 m.³ of recycled mother liquor. Instead of the kieserite, there could also have been used 20.5 kg. calcined kieserite (98% MgSO₄) or 41 kg. of epsom salt. In the first of these alternatives, there should have been used 309 liters of water instead of the 306 liters and in the second alternative, there should have been used 285 liters.

356 kg. of SO₂ were then introduced into the suspension. 113 kg. of CO₂ escaped and at the same time 34 kg. of gypsum were precipitated which contained also other insoluble impurities derived from the dolomite and kieserite. Gypsum and the solution of the bisulfite were then separated by filtration and 118 kg. of MgO (obtained from the preceding run) were introduced into the solution. 900 kg. of wet MgSO₃·3H₂O separated out.

After separation of the mother liquor, drying and calcination of the product there were obtained 25 kg. MgO in addition to 356 kg. SO₂ which later were recycled into the operation. 118 kg. of the MgO were employed for setting up the next run. 107 kg. of MgO were obtained as final product. This product had the composition 98.9% MgO, 0.09% CaO, 0.14% Fe₂O₃, 0.80% SO₃.

The Fe₂O₃ of the crude magnesite was maintained in solution by means of ethylene diamine tetraacetic acid. The mother liquor was adjusted to a pH of 9 by means of 3.5 kg. of burnt lime in order to effect the elimination of the Fe₂O₃. All of the Fe₂O₃ precipitated together with the gypsum and was removed by filtration. The mother liquor was used for the next run.

The reactions occurring in this example are represented by the following equation:

(a)  20MgCO₃·CaCO₃ + MgSO₄ + 42SO₂ + H₂O (magnesite) ⟶
  21Mg(HSO₃)₂ + CaSO₄·2H₂O + 21 CO (b) corresponds to (a) in Example 3

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention.

What is claimed as new and desired to be protected by Letters Patent is set forth in the appended claims.

We claim:

1. The process of making magnesium oxide from a member selected from the group consisting of dolomite and mixtures of dolomite magnesite or kieserite with limestone or marble constituting a magnesium and calcium-containing raw material, the said process comprising in succession the steps of
 (a) forming a suspension of the magnesium-containing raw material in an aqueous medium together with magnesium sulfate if such is not present in the raw material and reacting the suspension with sulfur dioxide so as to form a solution of magnesium bisulfite and an insoluble residue including gypsum;
 (b) separating said gypsum and other insoluble residue from the said solution;
 (c) heating the dissolved magnesium bisulfite to above 100° C. to form an insoluble neutral hydrate of magnesium sulfite which is substantially free of calcium;
 (d) separating the hydrate from the mother liquor;
 (e) dehydrating the said magnesium sulfite hydrate; and
 (f) decomposing the sulfite to magnesium oxide while driving off the sulfur dioxide.

2. The process of claim 1, wherein the said raw material includes a source of calcium ions in its composition and the amount of said raw material and suspension medium are adjusted to provide for an amount of sulfate ions that is at least equimolar to the amount of calcium ions supplied by the raw material.

3. The process of claim 2, wherein limestone is employed as part of the raw material and the limestone is in ground form having a grain size between 0.1 and 1 millimeter.

4. The process of claim 2, wherein the amounts of raw material are adjusted to provide a ratio of calcium to sulfate ions of 1:2 to obtain a hydrate of magnesium sulfite in step (c) that is substantially free of CaO.

5. The process of claim 4, wherein the said ratio is between 1:1.6–1.8.

6. The process of claim 1, wherein the said raw material includes a source of carbonate ions in its composition and at least part of the carbon dioxide generated thereby is driven off during said reaction with sulfur dioxide.

7. The process of claim 1, wherein the decomposition of the magnesium sulfite is effected in a rotary furnace under an atmosphere of carbon dioxide.

8. The process of claim 1, wherein the sulfur dioxide formed in the heating step (c) is driven off by introducing an inert gas.

9. The process of claim 1, wherein the sulfur dioxide is driven off in the heating step (c) and a solid precipitate is formed followed by removal of the precipitate.

10. The process of claim 1, wherein the reaction of the said suspension with sulfur dioxide (step (a)) is effected upon cooling to a temperature not in excess of 30° C.

11. The process of claim 10, wherein the cooling is effected to a temperature between 10 and 25° C.

12. The process of claim 1, wherein the dissolved magnesium bisulfite after elimination of the residue is converted to the hydrate of magnesium sulfite by adding fresh MgO or $Mg(OH)_2$ to the solution.

13. The process of claim 12, wherein the addition of the MgO or $Mg(OH)_2$ is effected at room temperature and upon stirring.

14. The process of claim 13, wherein the MgO or $MgO(OH)_2$ are added in dry form.

15. The process of claim 13, wherein the MgO or $Mg(OH)_2$ are added in the form of an aqueous suspension containing 50–400 grams per liter of solids.

16. The process of claim 1 wherein the hydrate of the magnesium sulfite obtained in step (c) is the trihydrate.

17. The process of claim 12, wherein about one-half of the final MgO or $Mg(OH)_2$ obtained in one run is recycled for use in the next run in the conversion of the magnesium sulfite to the hydrate (step (c)).

18. The process of claim 1, wherein the decomposition of the magnesium sulfite to MgO or $Mg(OH)_2$ (step (f)) is effected at a temperature of between 500 and 1000° C. in the presence of wet vapor while driving off the $SO_2$ and recycling it for the treatment of the magnesium sulfate suspension (step (a)).

19. The process of claim 1, wherein the concentration of the mother liquor separated from the magnesium bisulfite hydrate (step (d)) is increased with magnesium sulfate and the liquor is then recycled for use in the said suspension (step (a)).

20. The process of claim 19, wherein the concentration of the mother liquor is improved so as to provide for 300–400 grams of magnesium sulfate per liter of liquid.

21. The process of claim 19, wherein the gypsum filtered out from the magnesium bisulfite solution (step (b)) is washed with water and the wash water is then added to the said mother liquor for recycling.

22. The process of claim 20, wherein the concentration of the mother liquor is improved to provide for a contents of 350 grams of magnesium sulfate per liter.

23. The process of claim 20, wherein the concentration of the mother liquor is improved by means of passing the mother liquor through kieserite at a temperature between 40 and 70° C.

24. The process of claim 23, wherein the temperature employed is 65° C. and the kieserite is crude kieserite or calcined kieserite.

25. The process of claim 1 wherein the sulfur dioxide driven off upon converting the magnesium bisulfite solution to an insoluble magnesium sulfite hydrate (step (c)) and upon decomposing the magnesium sulfite hydrate to magnesium oxide or magnesium hydroxide (step (f)) is recycled for treatment of the magnesium sulfate suspension (step (a)).

26. The process of claim 2, wherein the magnesium sulfate suspension is formed by introducing the magnesium and calcium containing raw material into the solution at a temperature of 30–40° C. in an amount to provide a molar ratio of $Ca:MgSO_4$ between 1:1.4 and 1:2.

27. The process of claim 1, wherein the limestone is employed in the form of ground limestone having a grain size between 0.1 and 1 millimeter.

28. The process of claim 27, wherein the grain size of the limestone is between 0.1 and 0.2 millimeter.

References Cited

UNITED STATES PATENTS

| | | | |
|---|---|---|---|
| 2,210,405 | 8/1940 | Haywood | 23—129 |
| 2,381,053 | 8/1945 | Holmes | 23—201 |
| 2,644,748 | 7/1953 | Cunningham | 23—201 X |
| 2,727,028 | 12/1955 | Russell et al. | 23—129 X |

FOREIGN PATENTS

| | | | |
|---|---|---|---|
| 516,870 | 4/1921 | France | 23—201 |

OSCAR R. VERTIZ, Primary Examiner

G. ALVARO, Assistant Examiner

U.S. Cl. X.R.

23—130, 177